(12) United States Patent
Misaki et al.

(10) Patent No.: US 7,708,326 B2
(45) Date of Patent: May 4, 2010

(54) LOCK DEVICE FOR MOTORCYCLE SIDE TRUNK

(75) Inventors: Kenichi Misaki, Saitama (JP); Ikuo Hara, Saitama (JP); Yoshihiro Inoue, Saitama (JP); Masayuki Dazai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 867 days.

(21) Appl. No.: 11/391,556

(22) Filed: Mar. 29, 2006

(65) Prior Publication Data

US 2006/0220406 A1 Oct. 5, 2006

(30) Foreign Application Priority Data

Mar. 31, 2005 (JP) ............................. 2005-101933

(51) Int. Cl.
*E05C 19/02* (2006.01)
(52) U.S. Cl. .................. 296/37.1; 292/259 A
(58) Field of Classification Search ............... 296/37.1; 292/259 A, DIG. 3, DIG. 14, DIG. 23
See application file for complete search history.

(56) References Cited

U.S. PATENT DOCUMENTS

| 1,665,642 | A | * | 4/1928 | Sankey ...................... 224/539 |
| 1,794,786 | A | * | 3/1931 | McBride et al. ............... 292/48 |
| 3,026,132 | A | * | 3/1962 | Korab et al. ................... 292/11 |
| 3,413,025 | A | * | 11/1968 | Sperry ........................ 292/111 |
| 4,273,368 | A | * | 6/1981 | Tanaka ........................ 292/53 |
| 4,726,203 | A | * | 2/1988 | Komuro ....................... 70/263 |
| 5,025,883 | A | * | 6/1991 | Morinaka et al. ........... 180/219 |
| 5,042,853 | A | * | 8/1991 | Gleason et al. ............. 292/126 |
| 5,107,949 | A | * | 4/1992 | Gotoh et al. ................ 180/219 |
| 5,235,830 | A | * | 8/1993 | Benge ........................... 70/56 |
| 5,308,126 | A | * | 5/1994 | Weger et al. ................. 292/53 |
| 6,334,560 | B1 | * | 1/2002 | Lentini ....................... 224/404 |
| 6,502,868 | B1 | * | 1/2003 | Laspa et al. ................... 292/26 |
| 6,623,071 | B2 | * | 9/2003 | Kawamoto et al. ..... 297/195.13 |
| 6,793,110 | B2 | * | 9/2004 | Hamilton .................... 224/413 |
| 6,857,298 | B2 | * | 2/2005 | Linares ........................ 70/159 |
| 6,994,393 | B2 | * | 2/2006 | Votruba et al. ......... 296/100.06 |
| 7,252,171 | B2 | * | 8/2007 | Augustine, Jr. ............. 180/219 |
| 7,448,663 | B2 | * | 11/2008 | Fujimoto et al. .............. 296/63 |
| 2004/0217846 | A1 | * | 11/2004 | Konno et al. ................ 340/5.73 |
| 2006/0180373 | A1 | * | 8/2006 | Hanagan ..................... 180/219 |
| 2008/0073937 | A1 | * | 3/2008 | Circle et al. ............. 296/182.1 |
| 2008/0169134 | A1 | * | 7/2008 | Tomolillo et al. .......... 180/6.24 |
| 2008/0173122 | A1 | * | 7/2008 | Bagnariol ..................... 74/478 |
| 2008/0178642 | A1 | * | 7/2008 | Sanders ........................ 70/64 |

FOREIGN PATENT DOCUMENTS

JP 6-74066 B2 9/1994

* cited by examiner

*Primary Examiner*—H Gutman
(74) *Attorney, Agent, or Firm*—Birch, Stewart, Kolasch & Birch, LLP

(57) ABSTRACT

A lock device capable of locking, in a closed state, a lid member for each of side trunks provided on both sides of the vehicle body rear portion of a motorcycle. The lock device includes a plurality of catch mechanisms with catches that are swingably supported by a trunk main portion via a plurality of associated pivots, respectively. The lock device so configured expands the possibility of the layout of a plurality of catch mechanisms.

17 Claims, 10 Drawing Sheets

LOCK DEVICE FOR MOTORCYCLE SIDE TRUNK

CROSS-REFERENCE TO RELATED APPLICATION

The present application claims priority under 35 U.S.C. §119 to Japanese Patent Application No. 2001-101933, filed Mar. 31, 2005, the entire contents of which are hereby incorporated by reference.

BACKGROUND OF THE INVENTION

1. Field of the Invention

The present invention relates to the improvement of a lock device capable of locking a lid, in a closed state, for each of side trunks attached to both sides of the vehicle body rear portion of a motorcycle.

2. Description of Background Art

A lock device has been known, for example, from Japanese Patent Publication No. Hei 6-74066. This lock device is configured such that a pair of strikers is provided on a lid and a pair of catch mechanisms each having a catch engageable swingably with a corresponding one of the strikers is provided on a trunk main part so as to switch simultaneously to a lock state or a unlock state by remote control.

In the lock device disclosed in Japanese Patent Publication No. Hei 6-74066 mentioned above, since the pair of catches is carried by a single straight rotary shaft, the respective rotary axes of the catches have to be positionally limited to the coaxial line. This restricts the layout of the pair of catch mechanisms.

SUMMARY AND OBJECTS OF THE INVENTION

The present invention has been made in view of the foregoing. It is an object of the invention to provide a lock device for a motorcycle side trunk that expands the possibility of the layout of a plurality of catch mechanisms.

According to a first aspect of the present invention, a lock device for a motorcycle side trunk, includes a plurality of strikers attached to a lid member which is in an openable and closable manner attached to a box-like trunk main part disposed at each side of a rear portion of a vehicle body and which constitutes the side trunk together with the trunk main part. A plurality of catch mechanisms includes respective catches capable of engaging with the strikers respectively for pivotal movement, and which are provided on the trunk main part so as to enable simultaneous switching by remote control to a lock state where the catches are brought into engagement with the respective strikers to keep the lid member in a closed position, or to an unlock state where the engagement of the catches with the respective strikers is permittedly released to enable opening of the lid member. The catches of the catch mechanisms are swingably supported by the trunk main portion via a plurality of associated pivots, respectively.

According to a second aspect of the present invention, the plurality of catch mechanisms are disposed to differ from each other in height and in distance from the center of the widthwise direction of the vehicle body.

According to a third aspect of the present, the plurality of catch mechanisms are interconnected through a connecting rod so as to be switched to the lock state or the unlock state at the same time.

According to a fourth aspect of the present invention, the plurality of catch mechanisms are supported by a common plate-like bracket.

According to a fifth aspect of the present invention, an operating lever which switches the plurality of catch mechanisms to the lock state and the unlock state is disposed below a grab rail disposed rearward of an occupant seat.

The effects of the present invention include the following:

According to the first aspect of the present invention, the catches of the plurality of catch mechanisms are swingably supported by the trunk main part side through the plurality of pivots associated with the catches, respectively. Therefore, it is not necessary that the catches of the catch mechanisms are disposed on the same axis, whereby the possibility of the layout of each catch mechanisms can be expanded.

According to the second aspect of the present invention, the plurality of catch mechanisms are disposed to differ from each other in height and in distance from the center of the widthwise direction. Therefore, it is possible to expand the possibility of the shape of the lid member and the design freedom of the positions at which the strikers are attached to the lid member.

According to the third aspect of the present invention, one-point-operation of the connecting rod 52 makes it possible to switch the plurality of catch mechanisms to the lock state or the unlock state simultaneously, which can simplify the synchronous-interlocking mechanism.

According to the fourth aspect of the present invention, since the plurality of catch mechanisms are supported by the common plate-like bracket, the assembling performance and supporting rigidity of the catch mechanisms can be enhanced, thereby ensuring the smooth operation thereof.

According to the fifth aspect of the present invention, the operating lever can be located in an obscure position, which enhances the external appearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

FIGS. 1 through 14 illustrate the embodiment of the invention.

Figure 1:
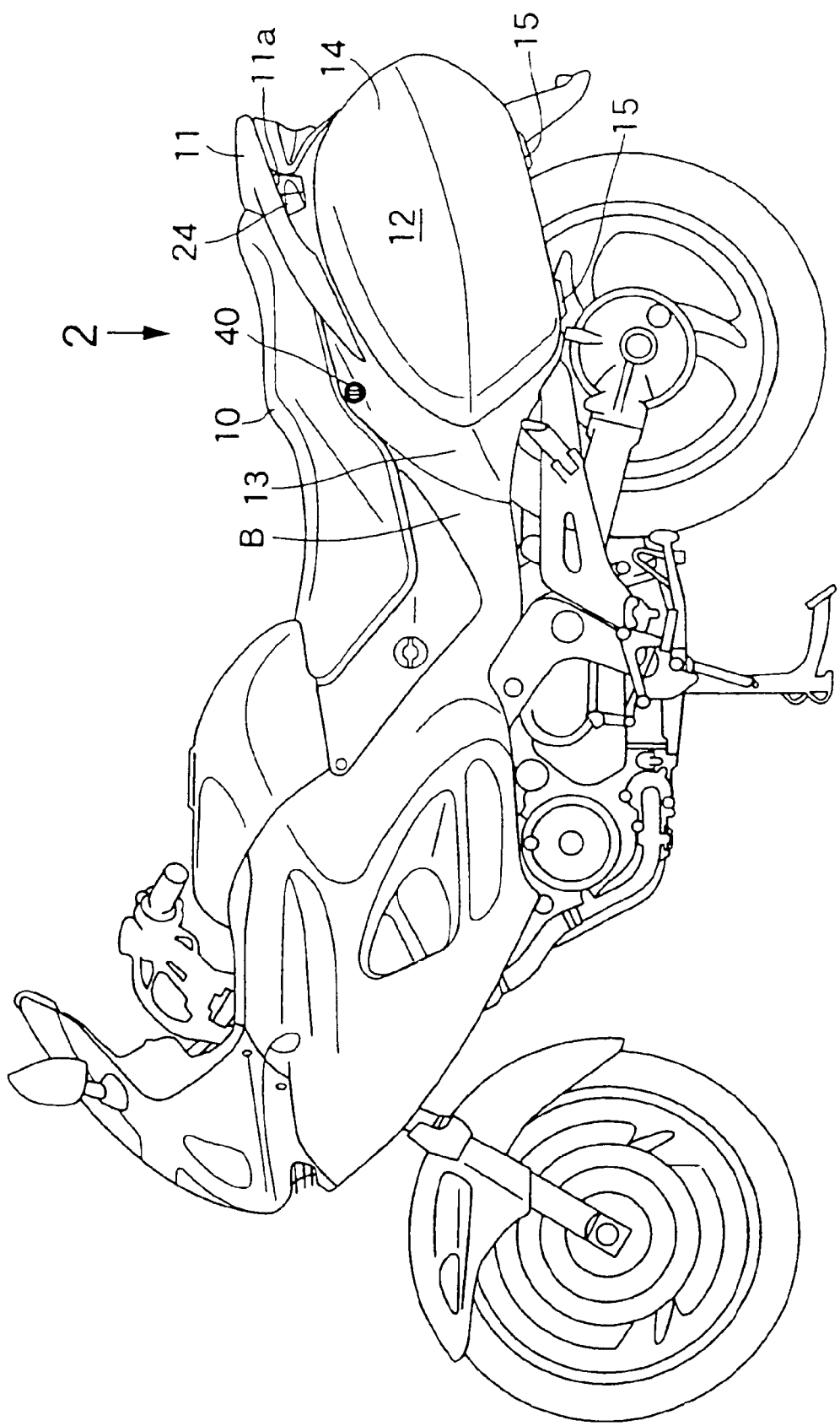
FIG. 1 is a side view of a motorcycle.

Referring first to FIG. 1, a motorcycle includes an occupant's tandem seat 10 mounted to the rear portion of a vehicle body B, a grab rail 11 disposed behind the seat 10, and side trunks 12 attached to the left and right sides of the seat 10. Both the side trunks 12 are arranged in a symmetrical manner. Only a side trunk 12 will be described below that is located on the left side with the motorcycle facing the front of its traveling direction. A right side trunk is not described.

Figure 2:
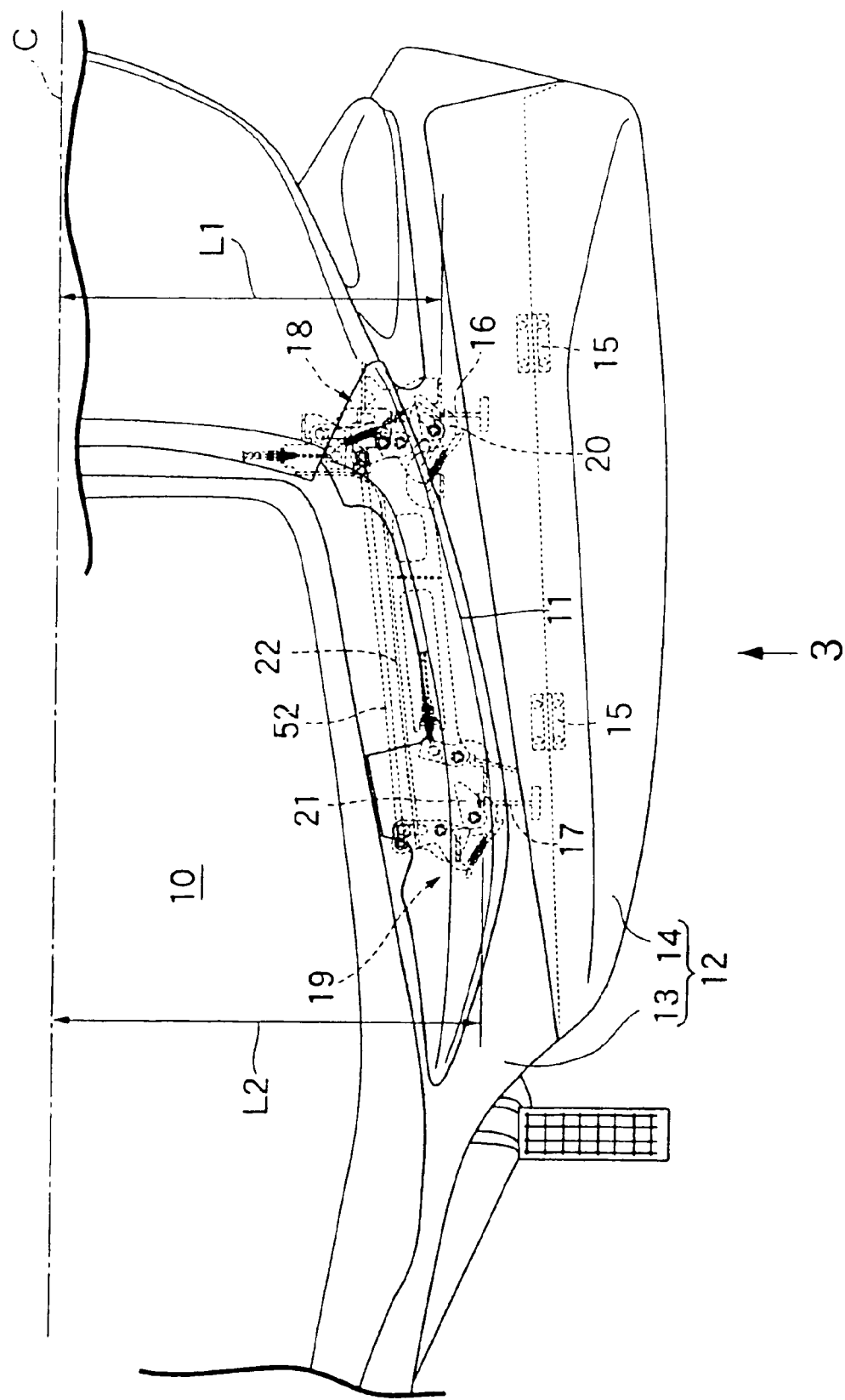
FIG. 2 is a view as viewed from arrow 2 of FIG. 1.
Figure 3:
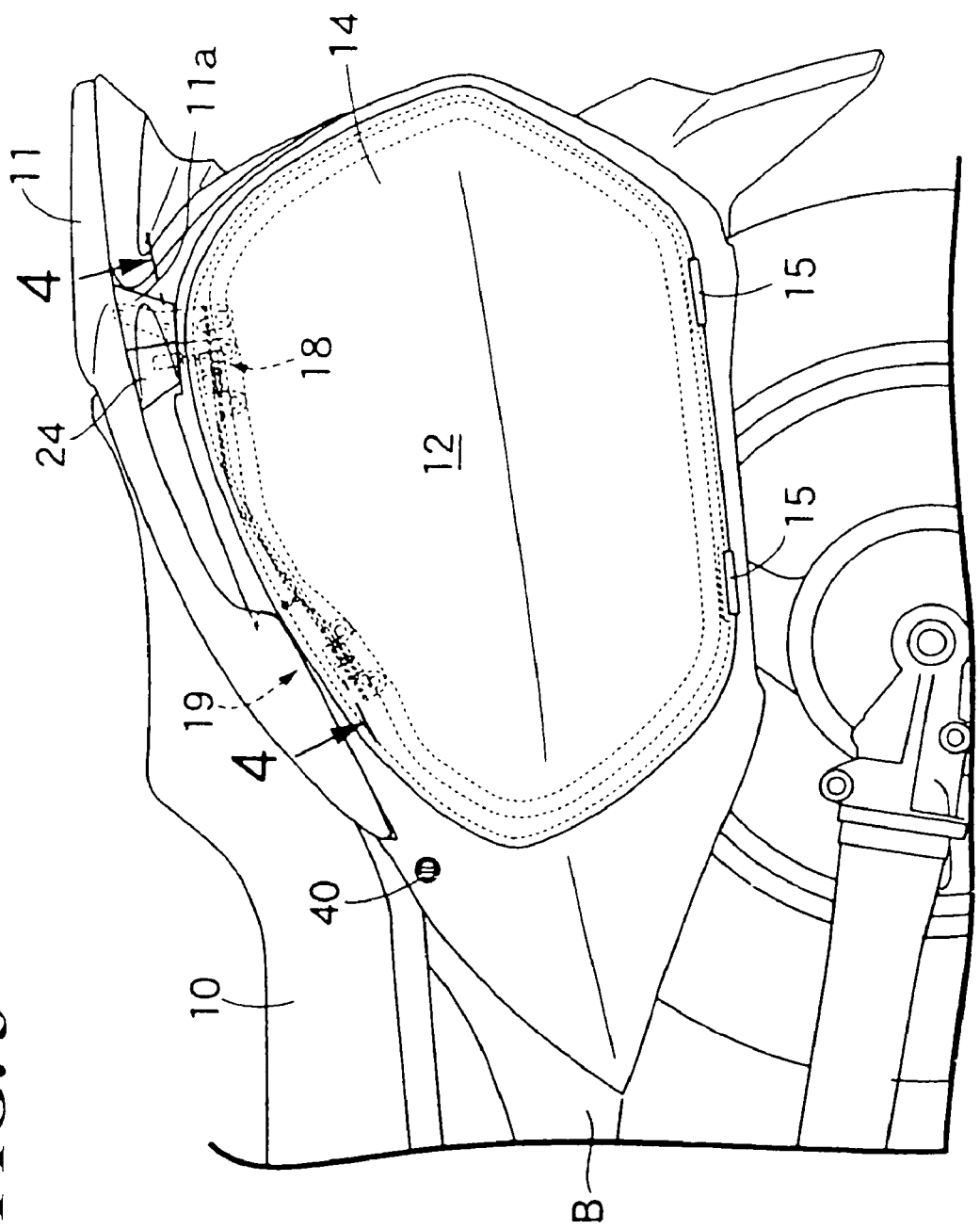
FIG. 3 is a view as viewed from arrow 3 of FIG. 2.

With additional reference to FIGS. 2 and 3, the side trunk 12 includes a box-like trunk main part 13 and a bowl-like lid member 14. The trunk main part 13 is attached to the rear portion of the vehicle body B so as to be open outwardly. The lid member 14 is swingably supported by hinges 15, 15 attached at respective two positions to the lower portion of the trunk main portion 13 so that it can close the opening end of the trunk main part 13. The trunk main part 13 and the lid member 14 are each made of a hard synthetic resin.

The lid member 14 is provided at its upper portion with a plurality of, e.g., a pair of first and second strikers 16, 17 which project toward the trunk main part 13. The second striker 17 is disposed to be spaced forwardly apart from the first striker 16. On the other hand, first and second catch mechanisms 18, 19 are provided on the vehicle body B on the side of the trunk main part 13, specifically, on the back surface side of the trunk main part 13. In addition, the first and second catch mechanisms 18, 19 are provided to be associated with the strikers 16, 17, respectively, and allow for simultaneous operation. When the lid member 14 is closed, the first and second strikers 16, 17 can project to the back surface side of the trunk main part 13 therethrough.

Figure 4:
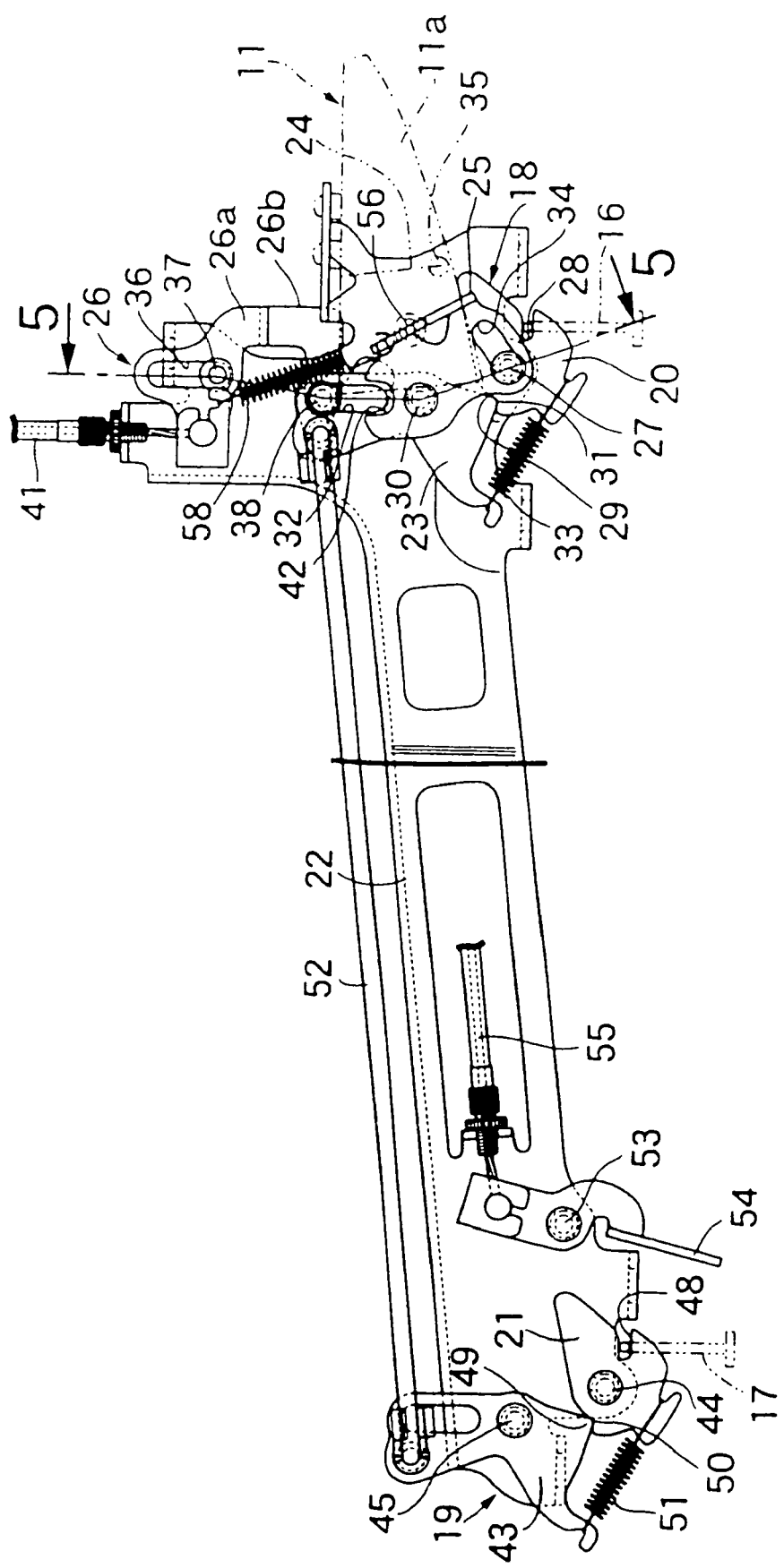
FIG. 4 is a cross-sectional view taken along line 4-4 of FIG. 3, showing a lock state.

With additional reference to FIG. 4, the first and second catch mechanisms 18 and 19 include first and second catches 20 and 21 engageable swingably with the first and second strikers 16 and 17, respectively. In addition, they can simultaneously switch to a lock state or an unlock state by remote control. In this lock state, the first and second catch mechanisms 18, 19 cause the first and second strikers 16, 17 to engage with the first and second catches 20, 21, respectively, to bring the lid member 14 into a closed position. In this unlock state, the first and second catch mechanisms 18, 19 permit the first and second strikers 16, 17 to disengage from the first and second catches 20, 21, respectively, thereby causing the lid member 14 to be open. In addition, the first and second catch mechanisms 18, 19 are carried by a plate-like common bracket 22, which is attached to the vehicle body B to extend in the back-and-forth direction of the motorcycle.

Figure 5:
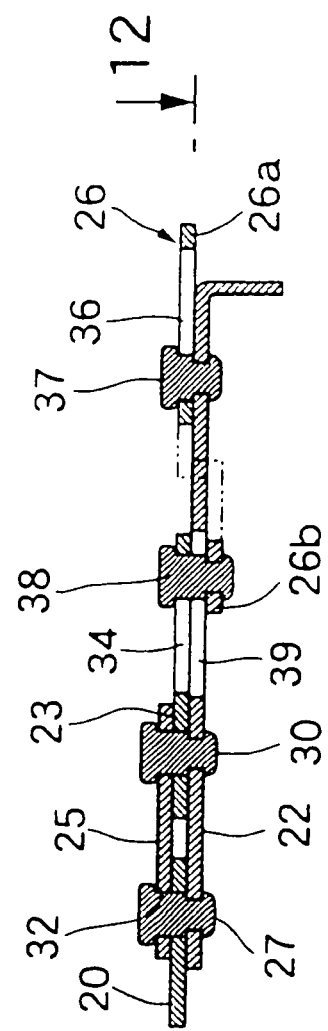
FIG. 5 is a cross-sectional view taken along line 5-5 of FIG. 4.

With additional reference to FIG. 5, the first catch mechanism 18 includes the first catch 20, a first cam plate 23, a driving member 25, and a slide member 26. The first catch 20 is swingably supported by the bracket 22 so as to enable engagement with the first striker 16. The first cam plate 23 is swingably supported by the bracket 22 so as to restrict the turning position of the first catch 20. The driving member 25 is connected to an operating lever 24 (see FIGS. 1 and 4) so as to drivingly turn the first cam plate 23 in response to the turning operation of the operating lever 24. The slide member 26 is slidably supported by the bracket 22 so as to switch to the engagement or disengagement of the driving member 25 with or from the first cam plate 23 in response to key operation.

Figure 6:
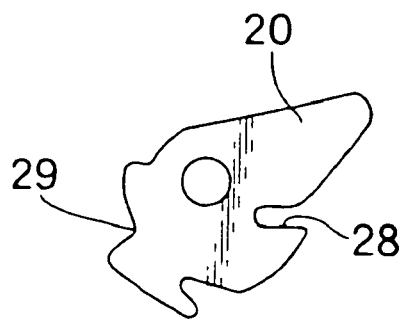
FIG. 6 is a plan view of a catch.

With additional reference to FIG. 6, the first catch 20 is swingably supported by the bracket 22 through a first pivot 27 so as to be in slidable contact with a surface of the bracket 22. In addition, the first catch 20 is provided at its circumferential portion with a retaining recess 28 adapted to engage the first striker 16 and a restrictive recess 29 disposed at a position opposite to the retaining recess 28 with respect to the first pivot 27.

Figure 7:
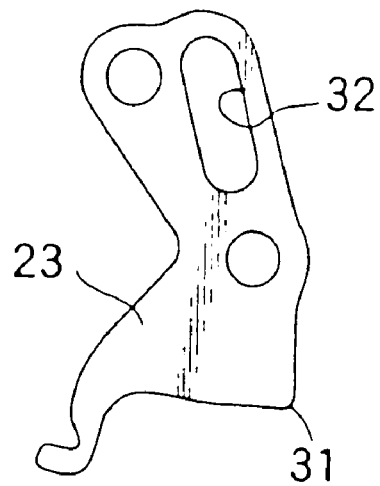
FIG. 7 is a plan view of a cam plate.

With additional reference to FIG. 7, the first cam plate 23 is swingably supported by the bracket 22 through a second pivot 30 parallel to the first pivot 27 while it is in slidable contact with the surface of the bracket 22. The first cam plate 23 is provided with a restrictive projection 31 adapted to engage with the restrictive recess 29 of the first catch 20, and a first guide hole 32 shaped in a longitudinal hole and extending along the radial direction of the second pivot 30. A first spring 33 is compressively disposed between the first cam plate 23 and the first catch 20 so as to bias the first cam plate 23 and the first catch 20 for causing the restrictive projection 31 to engage with the restrictive recess 29.

Figure 8:
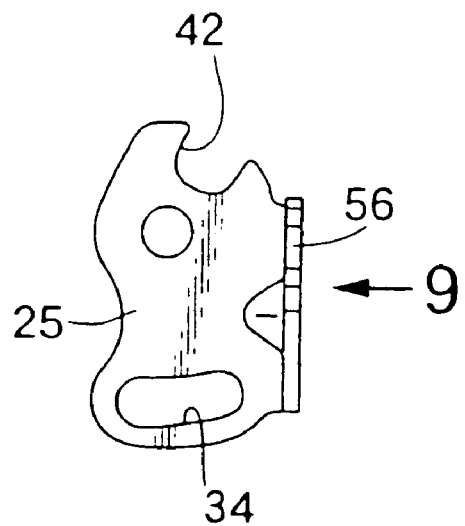
FIG. 8 is a plan view of a driving member.
Figure 9:
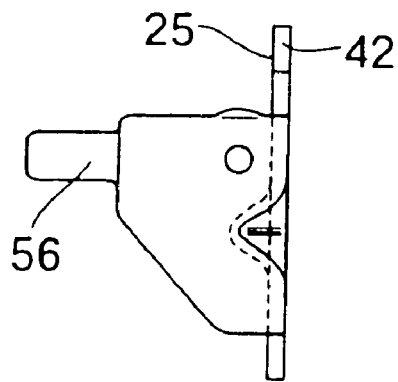
FIG. 9 is a view as viewed from arrow 9 of FIG. 8.

With additional reference to FIGS. 8 and 9, the driving member 25 is disposed to put the first catch 20 and the first cam plate 23 between the surface of the bracket 22 and the driving member 25. The driving member 25 is supported for turning by the second pivot 30 so as to be in slidable contact with the first catch 20 and the first cam plate 23. In addition, the driving member 25 is provided with a second guide hole 34 through which the first pivot 27 passes. The second guide hole 34 is formed in a circular arc extending around the axis of the second pivot 30.

Meanwhile, the operating lever 24 is disposed below the grab rail 11. More specifically, it is disposed in front of a leg portion 11a, which extends downward from the grab rail 11 and is fastened to the rear portion of the bracket 22. The operating lever 24 is supported for turning by a third pivot 35, which is disposed at an external front end of the leg portion 11a.

The driving member 25 is provided with a connecting projection 56 projecting therefrom and connected to the operating lever 24. If the operating lever 24 is operatively turned around the axis of the third pivot 35, the driving member 25 is turned around the second pivot 30 while shifting the position of the first pivot 27 within the second guide hole 34. Thus, when the operating lever 24 is inoperative, the driving member 25 is at a turning position where the first pivot 27 is at an end of the second guide hole 34. When the operating lever 24 is operatively turned, the driving member 25 is turned around the axis of the second pivot 30 in a clockwise direction of FIG. 4.

Figure 10:
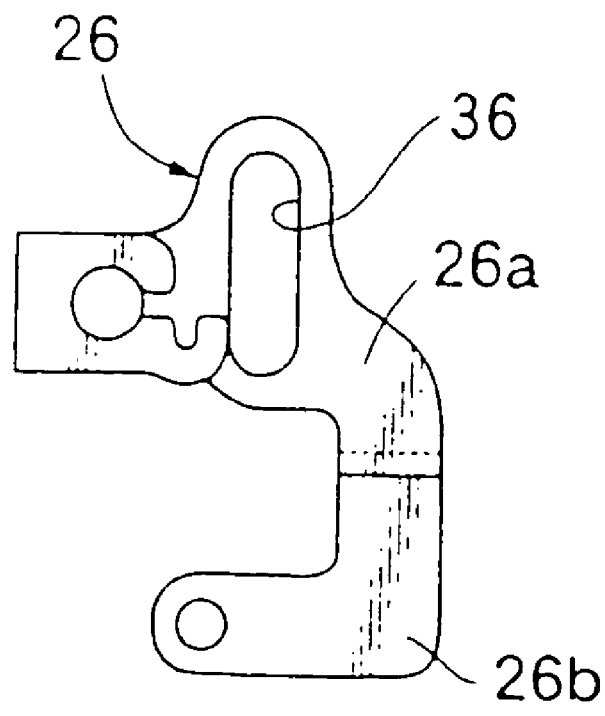
FIG. 10 is a plan view of a slide member.
Figure 11:
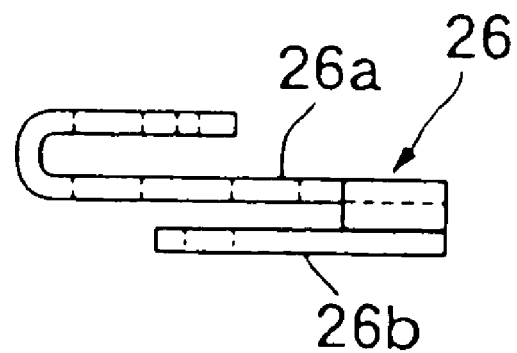
FIG. 11 is a view as viewed from arrow 11 of FIG. 10.

With additional reference to FIGS. 10 and 11, the slide member 26 includes a first slide plate part 26a disposed on the surface side of the bracket 22 and a second slide plate part 26b disposed on the back side of the bracket 22, which are integrally formed as an single piece. The first guide plate part 26a is formed with a third guide hole 36 which is in a longitudinal shape and extends parallel to the first guide hole 32 of the first slide plate part 26a when the driving member 25 is inoperative. A guide pin 37 is inserted through the third guide hole 36 and attached to the bracket 22 so as to guide the sliding movement of the first plate part 26a, i.e., the slide member 26. A spring 58 is compressively disposed between the driving member 25 and the slide member 26 so as to bias the slide member 26 toward the second pivot 30.

The second slide plate part 26b is provided at its end with an engaging pin 38, which passes through the bracket 22 and is inserted through the first guide hole 32 of the first cam plate 23. In addition, the bracket 22 is provided with a fourth guide hole 39 through which the engaging pin 38 passes.

Figure 12:
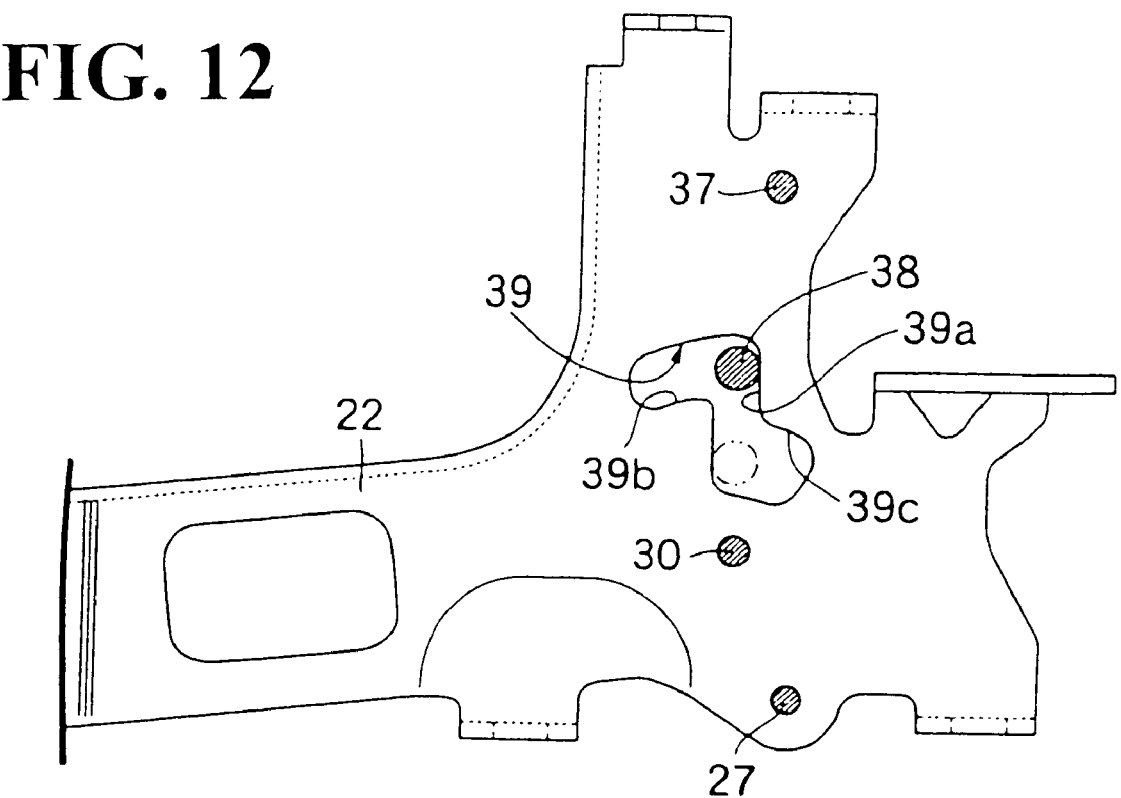
FIG. 12 is a cross-sectional view taken along line 12-12 of FIG. 5.

In FIG. 12, the fourth guide hole 39 includes a first hole portion 39a, a second hole portion 39b, and a third hole portion 39c. The first hole portion 39a extends linearly in parallel to the third guide hole 36 and along the radial direction of the second pivot 30 when the driving member 25 is not in operation. The second hole portion 39b continues into one end of the first hole part 39a spaced apart from the second pivot 30 and is formed in a circular arc around the axis of the second pivot 30. The third hole part 39c continues into the other end of the first hole part 39a close to the second pivot 30 and is formed in a circular arc around the axis of the second pivot 30.

Meanwhile, as shown in FIGS. 1 and 3, a key cylinder-lock 40 is attached to the left side surface of the vehicle body B at a position forward of the grab rail 11. A cable 41 connected to the key cylinder-lock 40 is connected to the slide member 26. When the first catch mechanism 18 is in a lock state, as shown in FIG. 4, the slide member 26 is at a withdrawal position or a lock position where the engaging pin 38 is positioned at one end of the first guide hole 32 spaced apart from the second pivot 30, that is, at one end of the first hole part 39a of the fourth guide hole 39. With this state, when the key cylinder-lock 40 is key-operated so as to be shifted from a lock position to an unlock position, the slide member 26 is moved to a forward position or an unlock position where as indicated with a chained line in FIG. 12 the engaging pin 38 is positioned at an end of the first guide hole 32 close to the second pivot 30, that is, at the other end of the first hole portion 39a of the fourth guide hole 39.

Additionally, the driving member 25 is provided with a retaining recess 42 with which the engaging pin 38 is brought into engagement when the slide member 26 lies at its forward-traveling unlock position. As shown in FIG. 4, when the slide member 26 lies at its backward-traveling lock position and the engaging pin 38 does not engage with the retaining recess 42, even if turning clockwise in FIG. 4, the driving member 25 engages with nothing. That is, the driving member 25 is not connected to the first cam plate 23, so that the first cam plate 23 will not be drivingly turned.

Figure 13:
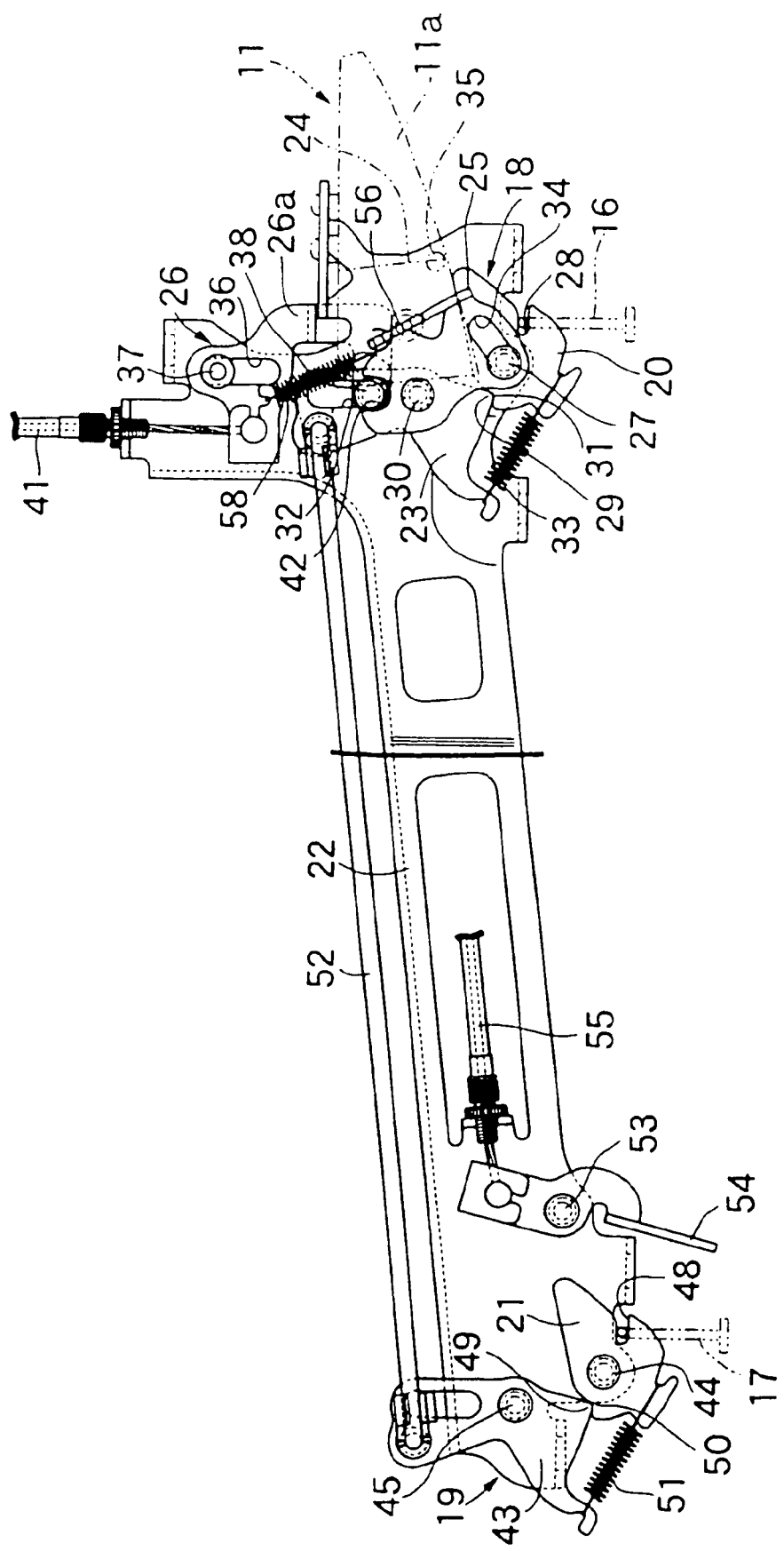
FIG. 13 is a cross-sectional view corresponding to FIG. 4, showing an unlock state.
Figure 14:
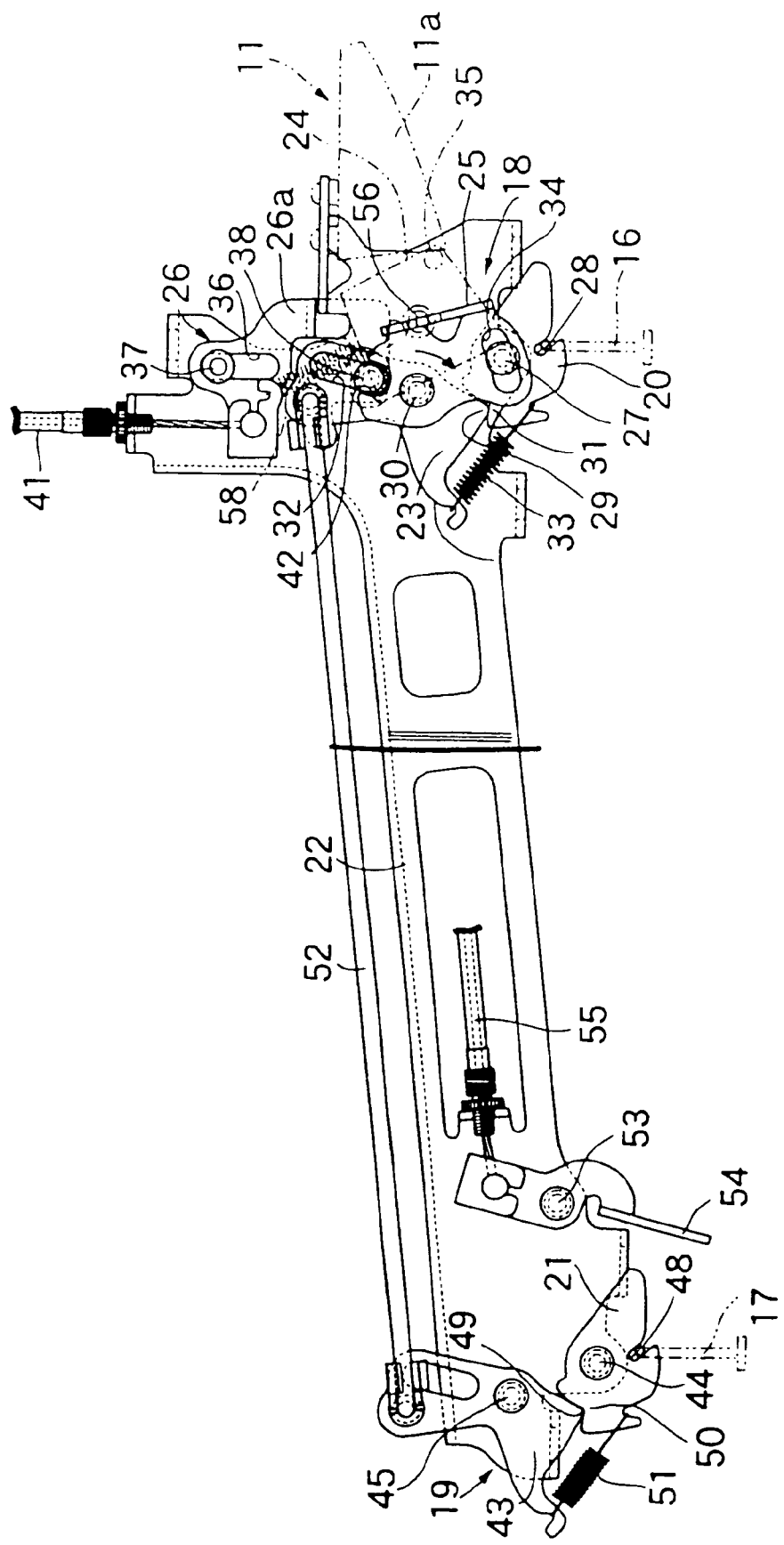
FIG. 14 is a cross-sectional view corresponding to FIG. 4, showing a state in the middle of releasing operation.

On the other hand, as shown in FIG. 13, when the slide member 26 lies at the forward-traveling unlock position and the engaging pin 38 engages with the retaining recess 42, the driving member 25 may be turned clockwise in FIG. 13. In this case, as shown in FIG. 14, the first cam plate 23 turns clockwise around the axis of the second pivot 30 while moving the engaging pin 38 within the second hole portion 39c of the fourth guide hole 39. Consequently, the first catch 20 is drivingly turned to a position where it is disengaged from the first striker 16.

The second catch mechanism 19 includes a second catch 21 and a second cam plate 43. The second catch 21 is swingably supported by the bracket 22 through a fourth pivot 44 so as to enable engagement with the second striker 17. The second cam plate 43 is swingably supported by the bracket 22 through a fifth pivot 45 so as to restrict the turning position of the second catch 21. As shown in FIG. 3, the second catch mechanism 19 is positioned lower than the first catch mechanism 18. In addition, as shown in FIG. 2, a distance L2 between the widthwise center C of the vehicle body B and the second catch mechanism 19 is set to a value smaller than a distance L1 between that and the first catch mechanism 18. In this way, the first and second catch mechanisms 18 and 19 are disposed at respective positions different from each other in height and in distance from the widthwise center C of the vehicle body B.

The second catch 21 is provided at its outer circumferential portion with a retaining recess 48 engageable with the second striker 17 and a restrictive recess 49 disposed on the opposite side of the retaining recess 48 with respect to the fourth pivot 44. In addition, the second catch 21 is formed to have a shape identical to that of the first catch 20 of the first catch mechanism 18. The second cam plate 43 is provided with a restrictive projection 50 engageable with the restrictive recess 49 of the second catch 21. In addition, the second cam plate 43 is formed to have a shape identical to that of the first cam plate 23 of the first catch mechanism 18. A second spring 51 is compressively provided between the second cam plate 43 and the second catch 21 to bring the restrictive projection 50 into engagement with the restrictive recess 49.

In this way, as shown in FIG. 4, in a lock state where the striker 17 is forced to engage with the retaining recess 48 of the second catch 21, if the second cam plate 43 is turned clockwise around the axis of the fifth pivot 45 as shown in FIG. 14, the second catch 21 is turned so as to release the engagement with the second striker 17.

In addition, the first and second catch mechanisms 18 and 19 are interconnected through a connecting rod 52 so that they may be switched to the lock state or the unlock state at the same time. The connecting rod 52 is connected at its respective ends to the first cam plate 23 of the first catch mechanism 18 and the second cam plate 43 of the second catch mechanism 19 so as to interconnect them. One end of the connecting rod 52 is disposed at a position corresponding to the second hole portion 39b of the fourth guide hole 39 included in the bracket 22. The one end of the connecting rod 52 is moved within the second hole portion 39b in accordance with the pivotal movement of the first cam plate 23. When both the catch mechanisms 18, 19 are in the lock state, one end of the connecting rod 52 and the engaging pin 38 which is located at one end of the fourth guide hole 39 included in the bracket 22 are situated on the extension of the connecting rod 52 so as to align with each other. An external force that pushes the connecting rod 52 toward the first catch mechanism 18 may be undesirably exerted onto the connecting rod 52 from the side of the second catch mechanism 19. Even in such a case, since coming into abutment against the engaging pin 38, the connecting rod 52 is prevented from further moving. Thus, the first cam plate 23 is not swingably moved in a direction releasing the engagement of the first catch 20 of the first catch mechanism 18 with the first striker 16.

Meanwhile, when the key-cylinder lock 40 is key-operated to the unlock position side and then unlocked, the operating lever 24 is brought into a state of projecting sideward from the vehicle body B. The operating lever 24 remains projecting from the vehicle body B unless the lid member 14 is closed and the first and second strikers 16, 17 are engaged with the first and second catches 18, 19, respectively, to come into a lock state. In addition, also the key-cylinder lock 40 is configured such that the key is prevented from being pulled out unless the locking is completed. With such a configuration, the key is not pulled out unless the lid member 14 is completely closed, so that the motorcycle is prevented from traveling with the lid member 14 not closed.

Additionally, a seat lock releasing lever 54 is inserted into the trunk main part 13 of the side trunk 12 located on the left side of the motorcycle with respect to the traveling direction. The seat lock releasing lever 54 is swingably supported by the bracket 22 via a sixth pivot 53. If the seat lock releasing lever 54 is operated with the lid member 14 being open, a seat lock mechanism (not shown) connected through a cable 55 to the seat lock releasing lever 54 is operated to release the lock state. Thus, the occupant seat 10 can be operated to be open.

The operation of the embodiment will be then described. The first and second catches 20 and 21 included in the first and second catch mechanisms 18 and 19 are swingably supported by the trunk main part 13 through the first and fourth pivots 27 and 44 associated with the first and second catches 20 and 21, respectively. Therefore, it is not necessary that the first and second catches 20, 21 are disposed on the same axis, whereby the possibility of the layout of the catch mechanisms 18, 19 can be expanded.

In addition, the first and second catch mechanisms 18 and 19 have their respective heights and respective distances from the center C of the widthwise direction, both different from each other. Therefore, it is possible to expand the possibility of the shape of the lid member 14 and the design freedom of the positions at which the first and second strikers 16 and 17 are attached to the lid member 14.

Furthermore, the first and second catch mechanisms 18, 19 are interconnected through the connecting rod 52 so that they may be switched to the lock state or the unlock state at the same time. Therefore, one-point-operation of the connecting rod 52 makes it possible to switch the catch mechanisms 18, 19 to the lock state or the unlock state simultaneously, which can simplify the synchronous-interlocking mechanism.

Since the first and second catch mechanisms 18, 19 are supported by the common plate-like bracket 22, the assembling performance and supporting rigidity of the first and second catch mechanisms 18, 19 can be enhanced, thereby assuring the smooth operation thereof.

The operating lever 24 which switches the first and second catch mechanisms 18, 19 to the lock state and the unlock state is disposed below the grab rail 11 disposed rearward of the occupant seat 10. Therefore, the operating lever 24 can be located in an obscure position, which enhances the external appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lock device for a motorcycle side trunk, comprising:
   a plurality of strikers attached to a lid member which is in an openable and closable manner attached to a box-shaped trunk main part disposed at each side of a rear portion of a vehicle body and which constitutes the side trunk; and
   a plurality of catch mechanisms which include respective catches capable of engaging with the strikers respectively for pivotal movement, and which are provided on the trunk main part so as to enable simultaneous switching by remote control to a lock state where the catches are brought into engagement with the respective strikers to keep the lid member in a closed position, or to an unlock state where the engagement of the catches with the respective strikers is permittedly released to enable opening of the lid member;
   wherein the catches of the catch mechanisms are swingably supported by the trunk main part via a plurality of associated pivots, respectively,
   wherein each of the plurality of associated pivots has an axis that is non-coaxial with others of the plurality of associated pivots,
   wherein each of the plurality of catch mechanisms of the side trunk is disposed to differ from each other in height and in distance from the center of the widthwise direction of the vehicle body.

2. The lock device for a motorcycle side trunk according to claim 1, wherein each of the plurality of catch mechanisms of the side trunk is interconnected through a connecting rod so as to be switched to the lock state or the unlock state at the same time.

3. The lock device for a motorcycle side trunk according to claim 1, wherein each of the plurality of associated pivots has an axis that extends downwardly and rearwardly with respect to the vehicle body.

4. The lock device for a motorcycle side trunk according to claim 1, wherein each of the plurality of catch mechanisms is supported by a common plate-like bracket.

5. The lock device for a motorcycle side trunk according to claim 1, wherein each of the plurality of catch mechanisms is supported by a common plate-like bracket.

6. The lock device for a motorcycle side trunk according to claim 1, wherein each of the plurality of catch mechanisms of the side trunk is disposed rearwardly with respect to a key cylinder-lock mounted on a side of the vehicle body.

7. The lock device for a motorcycle side trunk according to claim 1, further comprising an operating lever which switches the plurality of catch mechanisms to the lock state and the unlock state and which is disposed below a grab rail disposed rearward of an occupant seat.

8. A lock device for a motorcycle side trunk, comprising:
   a plurality of strikers attached to a lid member which is in an openable and closable manner attached to a box-shaped trunk main part disposed at each side of a rear portion of a vehicle body and which constitutes the side trunk; and
   a plurality of catch mechanisms which includes respective catches capable of engaging with the strikers respectively for pivotal movement, and which are provided on the trunk main part so as to enable simultaneous switching by remote control to a lock state where the catches are brought into engagement with the respective strikers to keep the lid member in a closed position, or to an unlock state where the engagement of the catches with the respective strikers is permittedly released to enable opening of the lid member,
   wherein the catches of the catch mechanisms are swingably supported by the trunk main part via a plurality of associated pivots, respectively,
   wherein each of the plurality of associated pivots has an axis that is non-coaxial with others of the plurality of associated pivots, and
   wherein the plurality of catch mechanisms is capable of simultaneously switching to the lock state or to the unlock state under remote controls
   wherein each of the plurality of associated pivots has an axis that extends downwardly and rearwardly with respect to the vehicle body.

9. The lock device for a motorcycle side trunk according to claim 8, wherein each of the plurality of catch mechanisms of the side trunk is disposed to differ from each other in height and in distance from the center of the widthwise direction of the vehicle body.

10. The lock device for a motorcycle side trunk according to claim 8, wherein each of the plurality of catch mechanisms is interconnected through a connecting rod so as to be switched to the lock state or the unlock state at the same time.

11. The lock device for a motorcycle side trunk according to claim 9, wherein each of the plurality of catch mechanisms is interconnected through a connecting rod so as to be switched to the lock state or the unlock state at the same time.

12. The lock device for a motorcycle side trunk according to claim 8, wherein each of the plurality of catch mechanisms is supported by a common plate-like bracket.

13. The lock device for a motorcycle side trunk according to claim 8, wherein each of the plurality of catch mechanisms is disposed rearwardly with respect to a key cylinder-lock mounted on a side of the vehicle body.

14. The lock device for a motorcycle side trunk according to claim 8, further comprising an operating lever which switches the plurality of catch mechanisms to the lock state and the unlock state and which is disposed below a grab rail disposed rearward of an occupant seat.

15. A lock mechanism for a motorcycle, comprising:
- first and second strikers attached to a lid member, the lid member being attached to a trunk main part in an openable and closable manner, the trunk main part being disposed at each side of a rear portion of a vehicle body, the rear portion of the vehicle body together with the trunk main part constituting a side trunk of the motorcycle; and
- first and second catch mechanisms which include respective catches capable of engaging with the strikers respectively for pivotal movement, and which are provided on the trunk main part so as to enable simultaneous switching by remote control to a lock state where the catches are brought into engagement with the respective strikers to keep the lid member in a closed position, or to an unlock state where the engagement of the catches with the respective strikers is permittedly released to enable opening of the lid member,
- wherein the first and second catch mechanisms are carried by a plate-shaped common bracket which is attached to the vehicle body to extend in the back-and-forth direction of the motorcycle, and
- wherein the catches of the first and second catch mechanisms are swingably supported by the trunk main part via first and second pivots, respectively,
- wherein the first and second pivots have axes that are non-coaxial with respect to each other, and
- further comprising a seat lock releasing lever inserted into the trunk main part, the seat lock releasing lever being swingably supported by the bracket via another pivot.

16. The lock mechanism for a motorcycle according to claim 15, wherein the first and second catch mechanisms of the side trunk are disposed to differ from each other in height and in distance from the center of the widthwise direction of the vehicle body.

17. The lock mechanism for a motorcycle according to claim 15, further comprising a key cylinder-lock connected to one of the first and second catch mechanisms via a cable.

* * * * *